United States Patent
Down et al.

(10) Patent No.: US 7,482,725 B2
(45) Date of Patent: Jan. 27, 2009

(54) SYSTEM AND METHOD FOR DIRECT LIQUID COOLING OF ELECTRIC MACHINES

(75) Inventors: Edward M. Down, Tucson, AZ (US); Wayne T. Pearson, Tucson, AZ (US); Mingzhou Xu, Tucson, AZ (US)

(73) Assignee: Honeywell International Inc., Morristown, NJ (US)

( * ) Notice: Subject to any disclaimer, the term of this patent is extended or adjusted under 35 U.S.C. 154(b) by 498 days.

(21) Appl. No.: 11/313,889

(22) Filed: Dec. 20, 2005

(65) Prior Publication Data

US 2007/0138878 A1 Jun. 21, 2007

(51) Int. Cl.
*H02K 3/34* (2006.01)

(52) U.S. Cl. .............................. 310/215; 310/52; 310/54

(58) Field of Classification Search ................... 310/52, 310/54, 57–59, 215
See application file for complete search history.

(56) References Cited

U.S. PATENT DOCUMENTS

| | | | |
|---|---|---|---|
| 1,448,700 A | 3/1923 | Seidner | |
| 2,221,567 A | 11/1940 | Baudry | |
| 2,727,161 A | 12/1955 | Kilner et al. | |
| 2,967,346 A * | 1/1961 | McMaster et al. | ............. 29/596 |
| 4,514,652 A | 4/1985 | Olsen | |
| 4,994,700 A | 2/1991 | Bansal et al. | |
| 5,081,382 A | 1/1992 | Collings et al. | |
| 5,578,879 A | 11/1996 | Heidelberg et al. | |
| 5,703,421 A * | 12/1997 | Durkin | ........................ 310/61 |
| 5,898,246 A * | 4/1999 | Hoffman | .................. 310/60 R |
| 6,515,384 B1 | 2/2003 | Kikuchi et al. | |
| 6,798,105 B1 | 9/2004 | Nilson | |
| 6,825,584 B2 | 11/2004 | Kulig et al. | |
| 6,856,053 B2 | 2/2005 | LeFlem et al. | |
| 2003/0151325 A1 | 8/2003 | Bharaj et al. | |

FOREIGN PATENT DOCUMENTS

| | | |
|---|---|---|
| EP | 1199787 | 4/2004 |
| GB | 722152 | 1/1955 |

OTHER PUBLICATIONS

PCT Application No. PCT/US2006/047784—International Search Report mailed Nov. 6, 2007.

\* cited by examiner

*Primary Examiner*—Dang D Le
(74) *Attorney, Agent, or Firm*—Oral Caglar, Esq.

(57) ABSTRACT

A system is provided for cooling a stator coil of a rotating machine. In one embodiment, and by way of example only, the system includes a stator core, a radial core opening, and a sleeve. The stator core has an axially extending slot formed therein, an outer circumferential surface, and an inner circumferential surface. The radial core opening extends from the stator core outer circumferential surface to the axially extending slot. The sleeve is disposed within the axial slot and configured to surround the stator coil. The sleeve has a cooling fluid supply port formed therein that is aligned with the radial core opening.

12 Claims, 4 Drawing Sheets

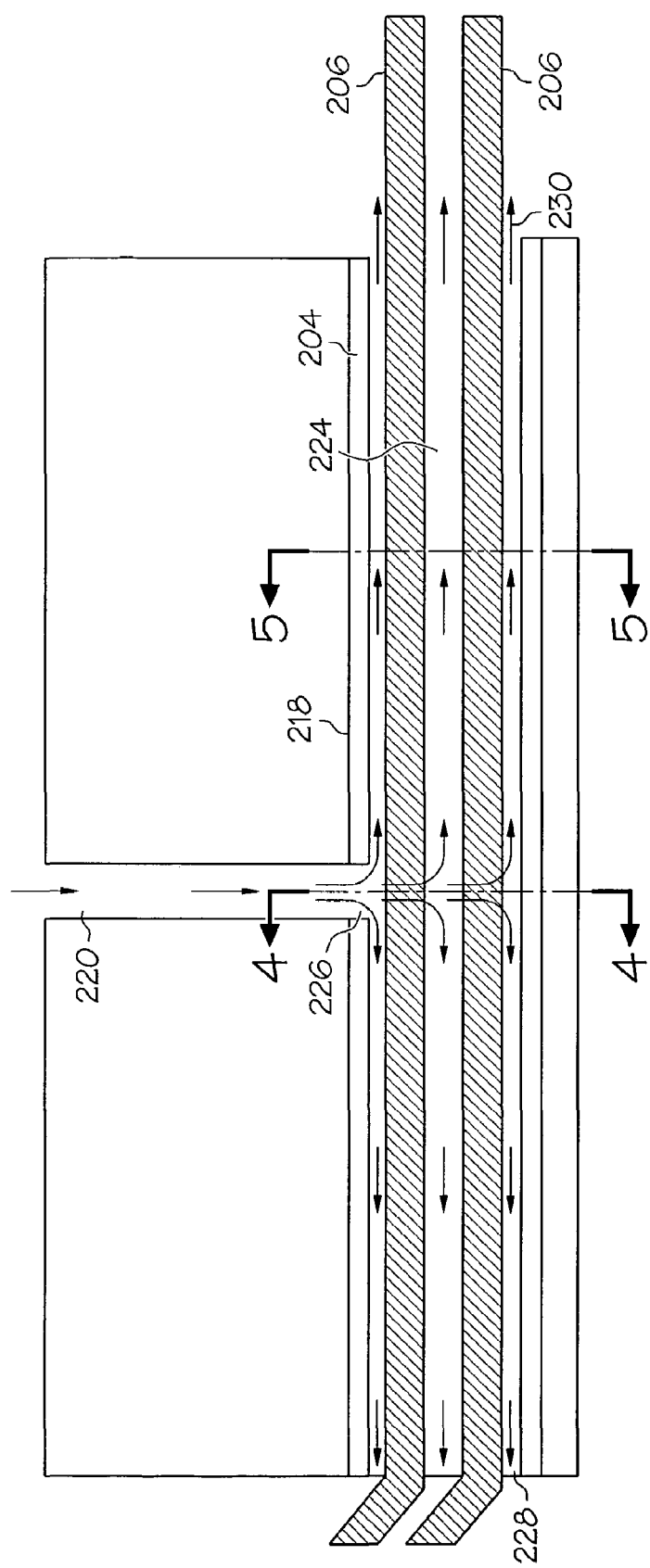

SYSTEM AND METHOD FOR DIRECT LIQUID COOLING OF ELECTRIC MACHINES

TECHNICAL FIELD

The present invention relates to rotating electrical machines and, more particularly, to a cooling system for a stator of a rotating electrical machine.

BACKGROUND

Aircraft systems include various types of rotating electrical machines, such as alternating current (AC) motors and generators of various designs. Generally, an AC machine includes a rotor and a stator. If the machine is operated as a motor, electrical power is supplied to the stator to develop a rotating electrical field. This rotating electrical field generates a torque in the rotor causing it to rotate. If the machine is operated as a generator, electrical power is supplied to the rotor to generate a magnetic field. A prime mover is coupled to the rotor causing it, and thus the generated magnetic field, to rotate. This rotating magnetic field induces a voltage into the stator, which supplies electrical power to a load.

A stator for AC machines may typically include a stator core having a plurality of wire coils wound around it. The stator core is generally formed by laminating a plurality of ring plates. The ring plates include an inner circumference that together form a main axial opening through the stator core for housing rotating components. A plurality of slots is formed in the inner circumference, and each of the slots extends along the axis of the main axial opening. Each slot includes an axial slit that allows communication between the slot and the main axial opening. The wire coils typically include ends that are inserted into the slots.

The wire coils may produce heat during machine operation and may, consequently, undesirably transfer the heat to the core. To prevent such a consequence, thermal insulating and/or cooling schemes are typically included in AC machines. In one example, a portion of each coil is wrapped with a thermally insulating liner that isolates coils from the stator core, and inhibits heat transfer to the core. Although this is adequate for small rotating machines, it typically does not sufficiently inhibit heat transfer in rotating machines that include larger sized cores. In other examples, cooling fluid or gas is directed into the stator slots and contacted with the coils. However, because the slots are typically designed to open into the main axial opening, the fluid or gas may leak through the opening and contact the rotating components causing the components to become inoperable.

Hence, there is a need for a cost-efficient, effective system for cooling an electrical rotating machine of any size. Additionally, it is desirable for the system to be capable of being retrofitted into existing electrical rotating machines. Moreover, it is desirable for the system to operate without affecting the rotating components of the machine.

BRIEF SUMMARY

The present invention provides a system for cooling a stator coil of a rotating machine. In one embodiment, and by way of example only, the system includes a stator core, a radial core opening, and a sleeve. The stator core has an axially extending slot formed therein, an outer circumferential surface, and an inner circumferential surface. The radial core opening extends from the stator core outer circumferential surface to the axially extending slot. The sleeve is disposed within the axial slot and configured to surround the stator coil. The sleeve has a cooling fluid supply port formed therein that is aligned with the radial core opening.

In another embodiment, and by way of example only, a system is provided for cooling a rotating machine having a plurality of stator coils disposed therein. The system includes a stator core, an axial slot, a radial core opening, a sleeve, a cooling fluid supply port, and cooling fluid. The stator core has an outer circumferential surface, an inner circumferential surface, and a length. The axial slot is formed in the stator core and extends the stator core length and configured to house at least a portion of the stator coil therein. The radial core opening is formed in the stator core and extends from the stator core outer circumferential surface to the axial slot. The sleeve is disposed within the axial slot and is configured to surround the stator coil portion. The cooling fluid supply port is formed in the sleeve and is aligned with the radial core opening. The cooling fluid is disposed in the rotating machine and flows through the radial core opening and the cooling fluid supply port to cool the stator coil.

In another embodiment, and by way of example only, a method is provided for cooling a rotating machine including a stator core having a radial opening extending there through, an axial slot formed in the stator core having a channel and an outlet therein that communicate with the radial opening, and a sleeve disposed in the axial slot and having a cooling fluid supply port in direct communication with the radial opening. The method comprises the steps of flowing cooling fluid through the rotating machine, directing the cooling fluid through the stator core radial opening, and flowing the cooling fluid through the cooling fluid supply port and axial slot channel.

Other independent features and advantages of the preferred cooling system will become apparent from the following detailed description, taken in conjunction with the accompanying drawings which illustrate, by way of example, the principles of the invention.

BRIEF DESCRIPTION OF THE DRAWINGS

FIG. 3 is a cross section view of the stator shown in FIG. 2 taken along line 3-3;

DETAILED DESCRIPTION OF A PREFERRED EMBODIMENT

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
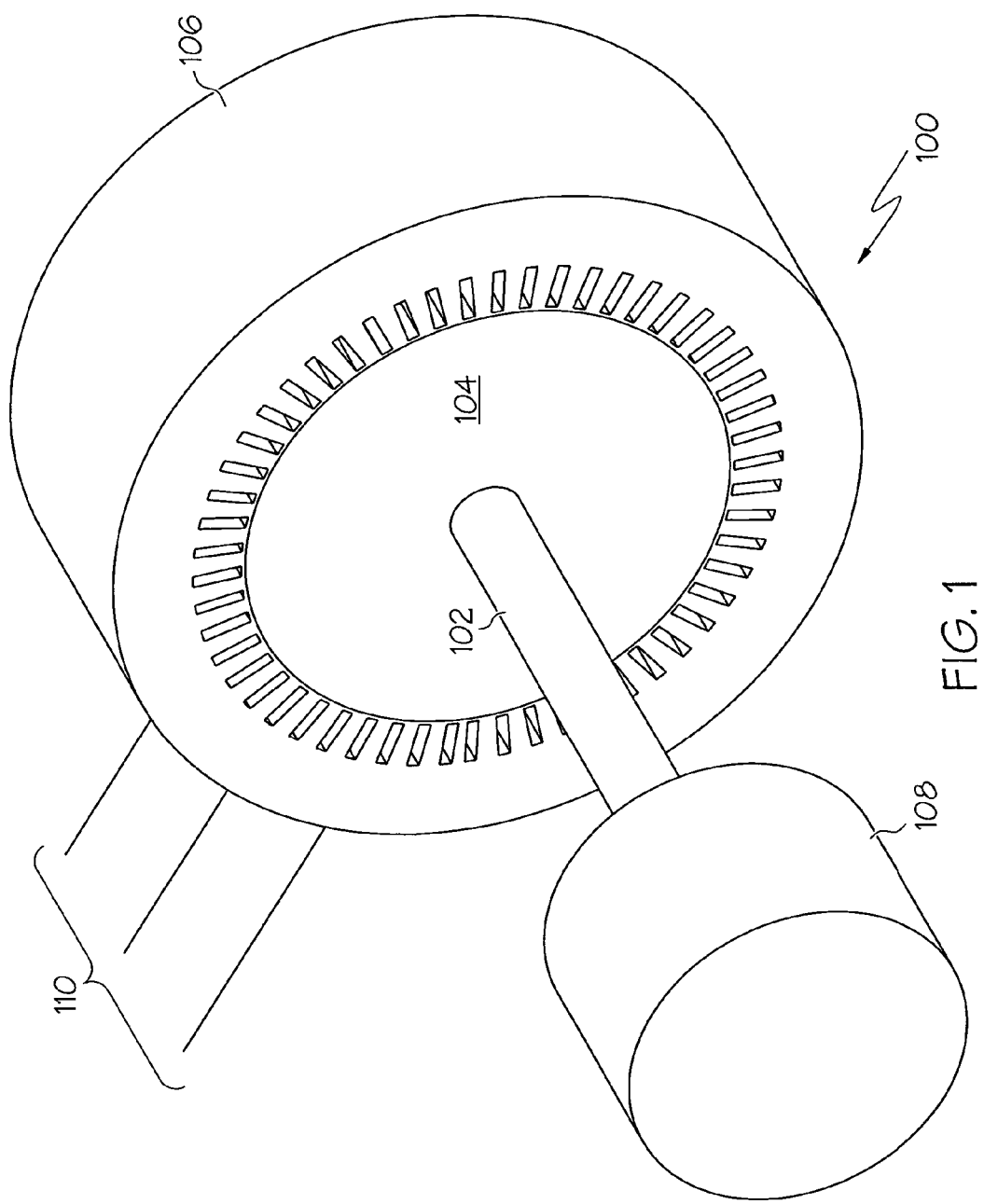
FIG. 1 is a simplified mechanical schematic representation of an exemplary rotating electrical machine.

A simplified mechanical schematic representation of a generalized embodiment of an AC machine 100 is depicted in FIG. 1. The machine 100 may be either an AC motor or an AC generator, and includes a shaft 102, a rotor 104, and a stator 106. A device 108 is coupled to the shaft 102. If the AC machine 100 is a generator, the device 108 is a prime mover for rotating the shaft 102 and the electrical power generated in the stator 106 is delivered to a load via a set of leads 110 that are coupled to each of the stator windings. If the AC machine 100 is a motor, the device 108 is a load to be rotated by the shaft 102 and power is supplied to the stator 106 from a source (not shown) via the leads 110. In either case, the AC machine 100 is preferably bathed in a fluid that may be contained therein or supplied thereto that is used to cool the machine 100. The cooling fluid may be a lubricant, such as oil, that supplied to the AC machine 100 by the prime mover or other oil contained in the AC machine 100.

Figure 2:
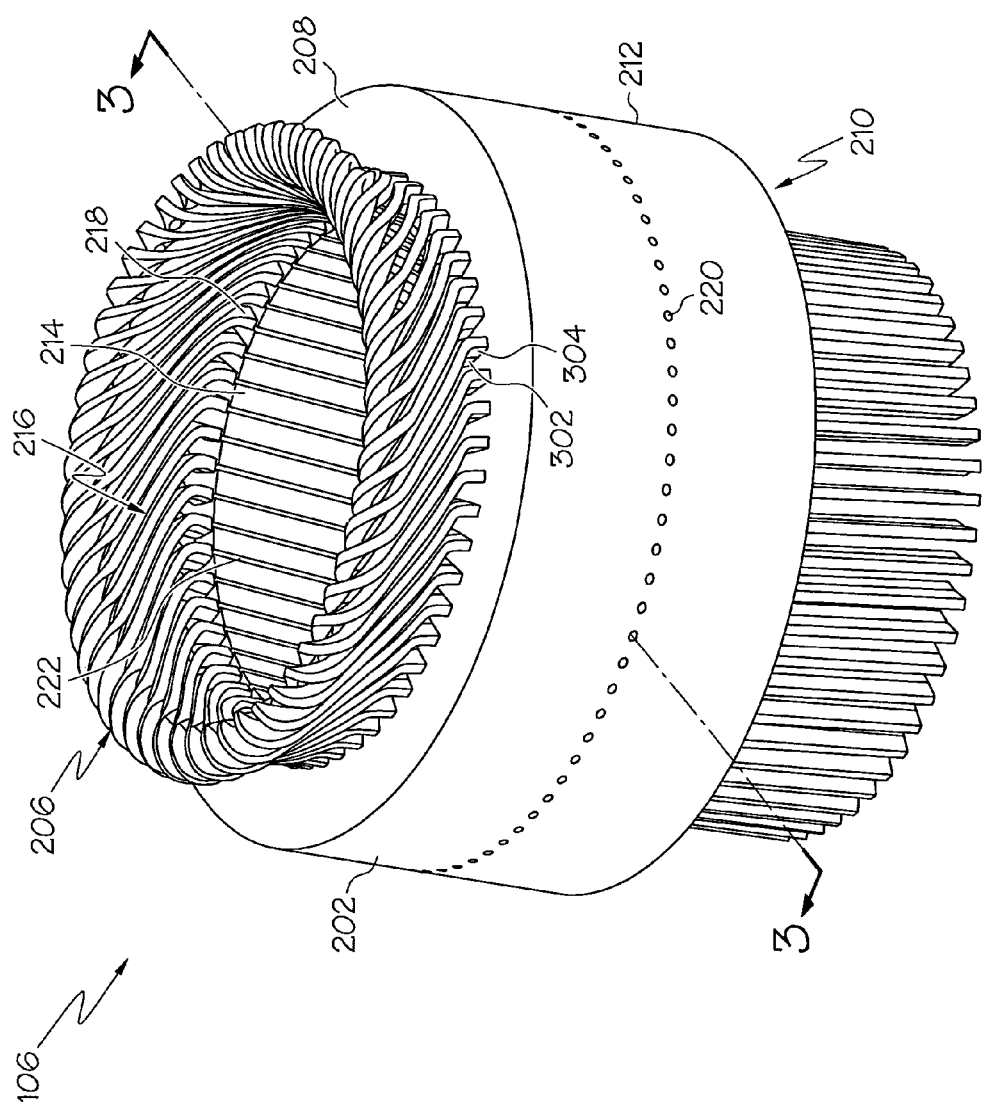
FIG. 2 is a perspective view of an exemplary main stator that may be implemented into the rotating electrical machine depicted in FIG. 1.

Turning now to FIG. 2, a perspective view of the stator 106 is provided. As shown in the figure, the stator 106 includes a stator core 202, a plurality of sleeves 204 (shown in FIGS. 3-5), and a plurality of stator coils 206 The stator core 202 is perferably formed from a plurality of laminations, and is preferably cylindrically shaped. It will be appreciated that the stator core 202 may alternatively be formed as a single, cast piece. It is noted that the stator core 202 may be formed of any one of numerous known materials known in the art including, but not limited to, electrical-grade steels such as cobalt-iron and silicon-iron. However, in a perferred embodiment the stator core 202 is formed of cobalt-iron.

The stator core 202 has a first end 208, a second end 210, an outer circumferential surface 212, and an inner circumferential surface 214. The inner circumferential surface 214 defines a main axial opening 216 and includes a plurality of slots 218. A plurality of radial openings 220 are formed between the inner and outer circumferential surfaces 212, 214.

As briefly alluded to above, each of the slots 218 is formed on the inner circumferential surface 214. The slots 218 preferably extend axially between the first and second ends 208, 210 of the stator core 202, and are preferably evenly spaced around the inner circumferential surface 214. As shown in FIG. 2, the slots 218 each include a slit 222 that provides communication between the slot 218 and the main axial opening 216. In addition, each of the slots 218 is radically sized to receive at least a portion of two stator coils 206, one in an inner slot position and another in an outer slot position. It will be appreciated that this slot configuration is merely exemplary of a preferred embodiment and that other slot configurations may alternatively be used.

The radial openings 220 are configured to provide a passage through which cooling fluid flows. To allow the cooling fluid to travel through most of the length of the slot 218, the radial openings 220 are preferably formed proximate one end of the core 202. Most preferably, the radial openings 220 are proximate the forward end of the core 202, shown in FIG. 2 as the first end 208. Additionally, the radial openings 220 are preferably formed in a circular pattern around the circumference of the core 202; however it will be appreciated that the openings 220 may alternatively be formed around the core 202 circumference in any one of numerous other suitable patterns.

Figure 5:
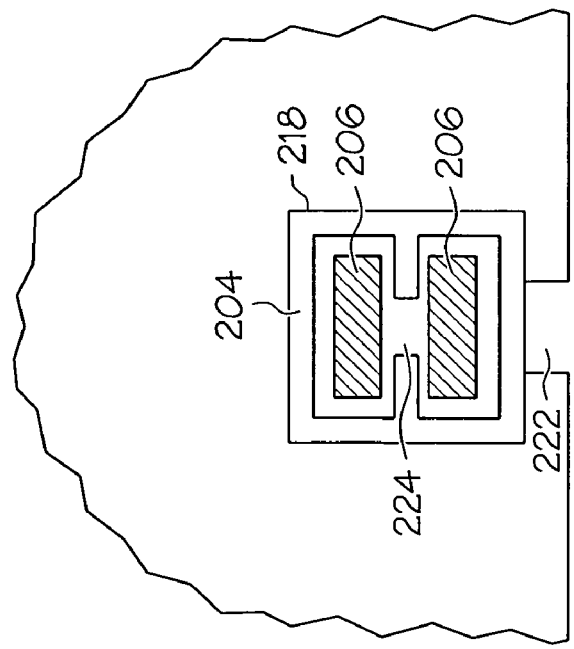
FIG. 5 is a cross section view of the stator shown in FIG. 3 taken along line 5-5.
Figure 4:
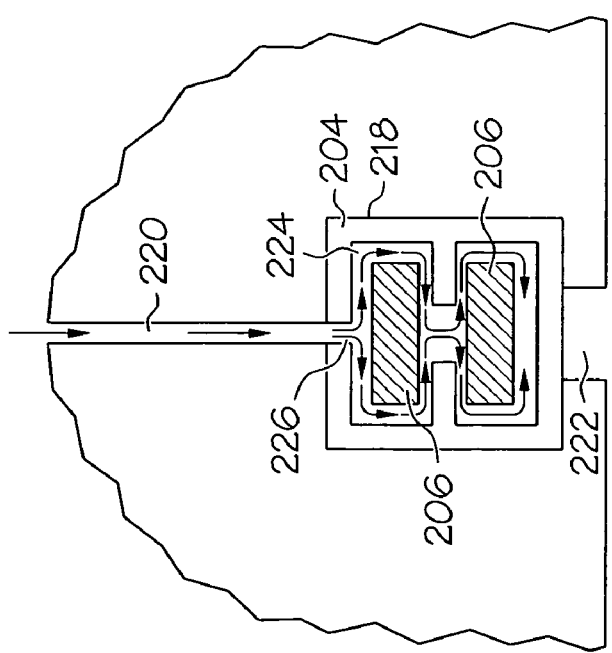
FIG. 4 is a cross section view of the stator shown in FIG. 3 taken along line 4-4.

With reference to FIGS. 3-5, as briefly mentioned above, the stator 106 also includes a plurality of sleeves 204. The sleeves 204 are configured to receive the cooling fluid supplied to the radial openings 220 and to direct the cooling fluid into contact with the coils 206. In this regard, each sleeve 204 is disposed, one each, in the slots 218, and may be placed, inserted, or alternatively molded into the slots 218. Each sleeve 204 includes a channel 224 and a cooling fluid supply port 226 and may be constructed from a material that will maintain structural integrity upon exposure to a temperature within the temperature range of an operating coil 206. For example, the sleeve 204 may be constructed of plastic or any other similar material, or may be made from thermally insulating materials, such as Nomex® or Kapton® (both available from E.I. du Pont de Nemours and Co. of Delaware).

The channel 224 is preferably configured to provide space for the insertion of one or more stator coils 206 therein and includes a stator coil inlet 228 and a stator coil outlet 230. In the embodiment depicted in FIGS. 3-5, two coil ends 206 are inserted into the channel 224 via the stator coil inlet 228 and extend out the stator coil outlet 230. The channel 224 may have any suitable radial cross-section shape, such as, for example, circular or rectangular, and may be any suitable size. For example, the channel 224 may be sized as large as the slot 218 and may have the same shape as the slot 218. Each cooling fluid supply port 226 communicates with the channel 224 and is formed such that when the sleeve 204 is appropriately disposed within the slot 218, the cooling fluid supply port 226 aligns and directly communicates with one of the radial openings 220 of the core 202.

Returning back to FIG. 2, the stator coils 206 are wound around the stator core 202 and each coils 206 includes two legs 302, 304 that are each inserted into two sperate slots 218. Accordingly, the legs 302, 304 are inserted into two sperate sleeves 204. Perferably, each leg 302, 304 is inserted into non-adjacent slots 218, though it will be appreciated that the present invention is not limited to this scheme. Each stator coil 206 is made from a conductive metal, such as copper, and is perferably rectangular in cross section. However, it will be appreciated that the coils 206 could be constructed of other conductive metals, such as aluminum, gold and silver, and could have other cross sectional shapes, such as round or square. Moreever, each coil 206 other cross sectional shapes, such as round or square. Moreover, each coil 206 could be constructed of a single conductor, or a purality of conductors.

Since the coils 206 are made of conductive metal, the temperature of the coils 206 may reach an undesirable range during stator 106 operation. To cool the coils 206, cooling fluid supplied to the rotating machine 100 is directed into and through the radial openings 220 of the core 202, through the sleeve openings 226, into the channel 224, until it reaches the corresponding coil 206. The cooling fluid then exits the sleeve 204 via the channel inlet 228 or the channel outlet 230.

A system has now been provided that inexpensively and efficiently cools stator coils 206. Additionally, the system may be easily implemented into existing stators. Moreover, the system isolates the cooling fluid from the rotating components of the electrical rotating machine.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A system for cooling a stator coil of a rotating machine, the system comprising:
   a stator core having an outer circumferential surface, an inner circumferential surface, and an axially extending slot formed on the inner circumferential surface;
   a plurality of radial core openings extending from the stator core outer circumferential surface to the axially extending slot;

a sleeve disposed within the axial slot, the sleeve having an internal channel and a cooling fluid supply entry port formed therein that is aligned with a radial core opening and a stator coil inlet and a stator coil outlet, the stator coil disposed to pass through the stator coil inlet and through the stator coil outlet such that a portion of the stator coil is disposed within the internal channel.

2. The system of claim 1, wherein the sleeve comprises an insulating material.

3. The system of claim 1, wherein the sleeve extends substantially the length of the axially extending slot.

4. The system of claim 1, wherein:
the sleeve contacts the stator core; and
the cooling fluid supply entry port and the radial core opening directly communicate with each other.

5. The system of claim 1, wherein a plurality of stator coil portions are disposed within the internal channel of the sleeve.

6. The system of claim 1, wherein the system further comprises a cooling fluid disposed in the rotating machine, the cooling fluid directed to flow through the radial core opening into the cooling fluid supply entry port and into the internal channel of the sleeve.

7. The system of claim 1, wherein the rotating machine is a generator.

8. The system of claim 1, wherein the rotating machine is a motor.

9. A system for cooling a rotating machine having a plurality of stator coils disposed therein, comprising:
a stator core having an outer circumferential surface, an inner Circumferential surface, and a length;
a plurality of axial slots formed on the inner circumferential surface and extending the stator core length and configured to house a portion of the stator coils therein;
a plurality of inlet radial core openings formed in the stator core, each inlet radial core opening extending from the stator core outer circumferential surface to an axial slot;
a plurality of sleeves each disposed within an axial slot, each sleeve including an internal channel and a cooling fluid supply entry port formed therein that is aligned with a radial core opening and a stator coil inlet and a stator coil outlet, a plurality of the portions of the stator coils disposed through the stator coil inlet and through the stator coil outlet; and
a cooling fluid disposed in the rotating machine, the cooling fluid directed to flow through the inlet radial core openings and into the cooling fluid supply entry ports and into the internal channels thereby flowing over the surfaces of the stator coil portions.

10. The system of claim 9, wherein the sleeve comprises an insulating material.

11. The system of claim 9, wherein the sleeves extends substantially the length of the axial slots.

12. A method for cooling a rotating machine, the rotating machine including a stator core having an outer circumferential surface, an inner circumferential surface, a plurality of stator coils, a plurality of radial openings extending therethrough, a plurality of axial slots formed on the inner circumferential surface, each axial slot having a channel and an outlet therein that communicate with a radial opening, and a sleeve having an internal channel disposed in each axial slot and having a cooling fluid supply entry port in direct communication with a radial opening and a stator coil inlet and a stator coil outlet, one or more of the plurality of stator coils disposed through the stator coil inlet and the stator coil outlet, the method comprising the steps of:
directing cooling fluid through the stator core radial openings into the cooling fluid supply entry ports and into the internal channel of each sleeve; and
directing the cooling fluid to flow through the internal channel of each sleeve and over the surfaces of each portion of the plurality of stator coils contained therein.

\* \* \* \* \*